Aug. 21, 1951 J. W. GRAY 2,565,366

SYNCHRONIZING AND PHASING SYSTEM FOR TELEVISION RECORDERS

Filed Dec. 8, 1949 5 Sheets-Sheet 1

Inventor

JOHN W. GRAY

By H. S. Mackey

Attorney

Aug. 21, 1951 J. W. GRAY 2,565,366

SYNCHRONIZING AND PHASING SYSTEM FOR TELEVISION RECORDERS

Filed Dec. 8, 1949 5 Sheets-Sheet 2

Inventor
JOHN W. GRAY

By H. S. Mackey
Attorney

Aug. 21, 1951 J. W. GRAY 2,565,366

SYNCHRONIZING AND PHASING SYSTEM FOR TELEVISION RECORDERS

Filed Dec. 8, 1949 5 Sheets-Sheet 3

Inventor

JOHN W. GRAY

By

H. S. Mackey

Attorney

SYNCHRONIZING AND PHASING SYSTEM FOR TELEVISION RECORDERS

Filed Dec. 8, 1949 5 Sheets-Sheet 4

Inventor
JOHN W. GRAY
By
H. S. Mackey
Attorney

Inventor
JOHN W. GRAY
By
H. L. Mackey
Attorney

Patented Aug. 21, 1951

2,565,366

UNITED STATES PATENT OFFICE 2,565,366

SYNCHRONIZING AND PHASING SYSTEM FOR TELEVISION RECORDERS

John W. Gray, White Plains, N. Y., assignor to General Precision Laboratory Incorporated, a corporation of New York Application December 8, 1949, Serial No. 131,796

10 Claims. (Cl. 178—7.4)

This invention relates to a method and apparatus for synchronizing and phasing television recorders and particularly to a system for ensuring proper synchronism and phase relationship between the periodic recurrence of television images and the intermittent advance of a motion picture strip on which the television images are projected.

This application is a continuation in part of the copending application of John W. Gray, Serial No. 55,806, filed October 21, 1948, now abandoned.

One method which has been proposed for recording a received television image on motion picture film, for later use or record purposes, is to project the image formed on the screen of a cathode ray receiving tube on an intermittently advanced film strip, the duration of light allowed to impinge on any one motion picture frame being made exactly equal to one television field of two interlaced scans.

Inasmuch as the motion picture film strip is advanced by the usual intermittent mechanism at the rate of 24 frames per second a shutter of some form must be used to ensure that no light is allowed to reach the film strip while it is moving. Correct time relations must, therefore, be maintained between the operation of the shutter and the pull down operation of the camera intermittent mechanism.

In the present instance an electronic shutter is used which operates in accordance with the received television synchronizing signals to ensure that the screen of the cathode ray receiving tube is illuminated for a period of exactly one television frame and is then rendered dark for a sufficient length of time to permit the camera intermittent mechanism to operate. At the same time the electronic shutter generates a master signal and this signal is compared with the time of actuation of the camera intermittent mechanism, producing a signal which is utilized to operate an auxiliary motor to advance or retard the time of operation of the camera intermittent mechanism as the need arises.

The mechanism of the instant invention utilized for comparing the master signal generated by the electronic shutter and the time of actuation of the intermittent mechanism employs a simple yet efficient arrangement of relays, motor and differential gearing, producing a simple and economical yet exceedingly reliable device. Additionally high power output is realized without sacrifice of sensitivity of operation.

The invention will be more readily understood from the following detailed description when considered together with the attached drawings in which.

Figure 1:
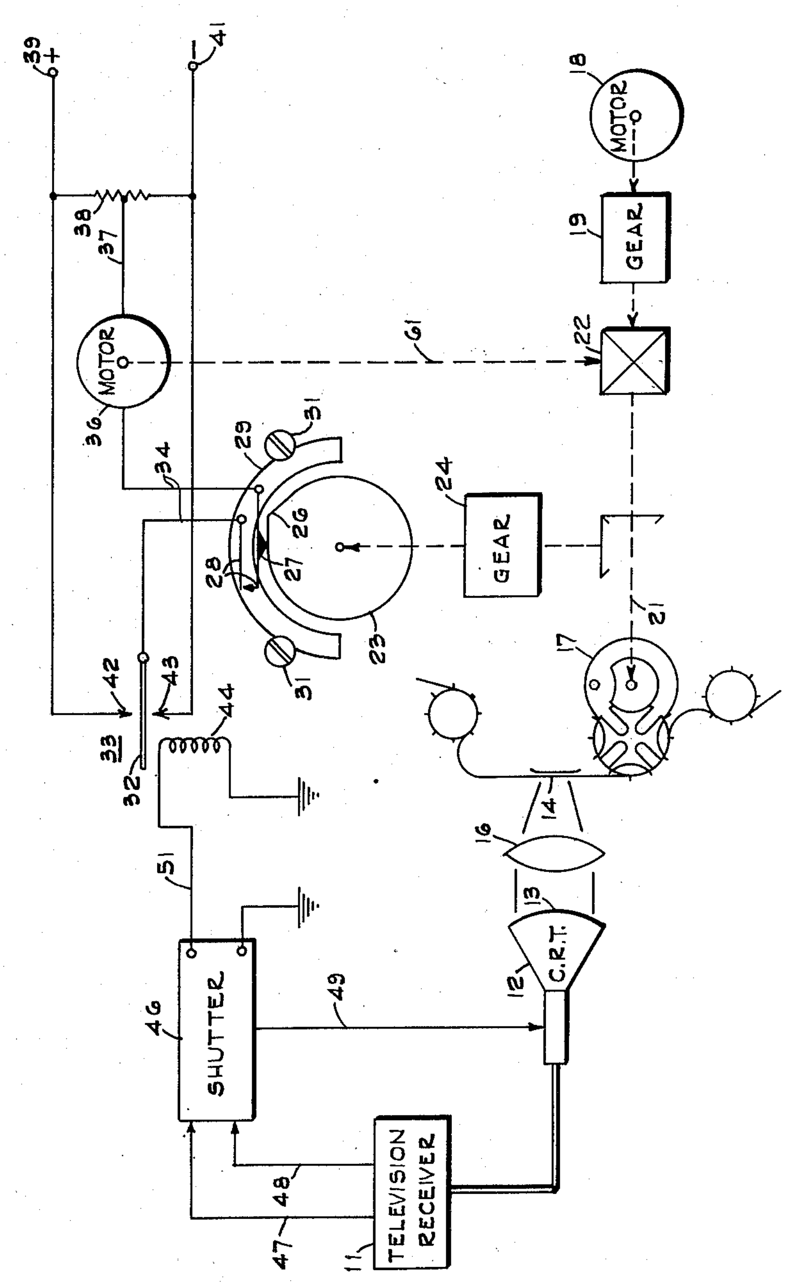
Figure 1 is a schematic illustration of one form of the invention.

Referring now to Fig. 1 a television receiver 11 is provided with a cathode ray tube 12 having a screen 13 on which the light images representative of the received television video signals are displayed. The light images formed on the screen 13 are projected on the film strip 14 by a lens system diagrammatically illustrated by the single lens 16. As is customary, the film strip 14 is intermittently advanced at a rate of 24 frames per second by the intermittent mechanism diagrammatically illustrated at 17.

The intermittent mechanism 17 is driven by a motor 18 through the medium of appropriate drive gears 19 shaft 21 and differential gears 22, the purpose of which will be more fully set forth hereinafter. The shaft 21 also rotates the cam 23 through the medium of 2:1 step down gears 24, so that the cam 23 rotates at half the speed of the intermittent 17, that is, 12 revolutions per second.

The cam 23 is provided with a raised portion 26 which once each revolution engages the follower 27 closing the switch 28. The switch 28 is affixed to an arcuate member 29 clamped to a suitable frame (not shown) by screw members 31, thereby permitting a limited amount of rotational adjustment of the switch 28 about the center of the cam 23 for the purpose of ensuring proper phase relation between the actuation of the switch contacts 28 and the pull down actuation of the intermittent mechanism 17.

The switch 28 is included in a circuit comprising the armature 32 of a polarized relay 33, conductors 34, motor 36, conductor 37 and the midpoint of a voltage divider resistor 38 connected between the direct current power supply terminals 39 and 41.

The positive supply terminal 39 is connected to the stationary contact 42 of the relay 33, while the negative supply terminal 41 is connected to the stationary contact 43. The motor 36 may be of the permanent magnet direct current type and hence, assuming for the present that the contacts 28 are closed to complete a circuit through the motor armature, of the contact 32 is caused to engage the contact 42 the motor 36 will have a torque applied thereto which tends to rotate it in one direction, whereas when the contact 32 engages the contact 43 a torque will be applied to the motor tending to rotate it in the opposite direction.

The contact 32 is caused to vibrate or alternately engage contacts 42 and 43 by supplying a 12 cycle master signal to the relay coil 44. This 12 cycle master signal is derived from the electronic shutter 46 which for the present may be described briefly as deriving vertical and horizontal synchronizing signals from the television receiver 11 through the conductors 47 and 48 and utilizing these signals to provide an intensifying signal which is applied to the cathode ray tube 12 through the conductor 49. This intensifying signal has a wave form such as illustrated at F of Fig. 2 wherein the intensifying potential is such that the cathode ray tube screen is illuminated for a period of time equal to one complete television picture twice in every interval of $\frac{1}{12}$ of a second and the remaining time of the $\frac{1}{12}$ second interval is divided into two not quite equal periods when the screen is maintained in a darkened condition.

Figure 2:
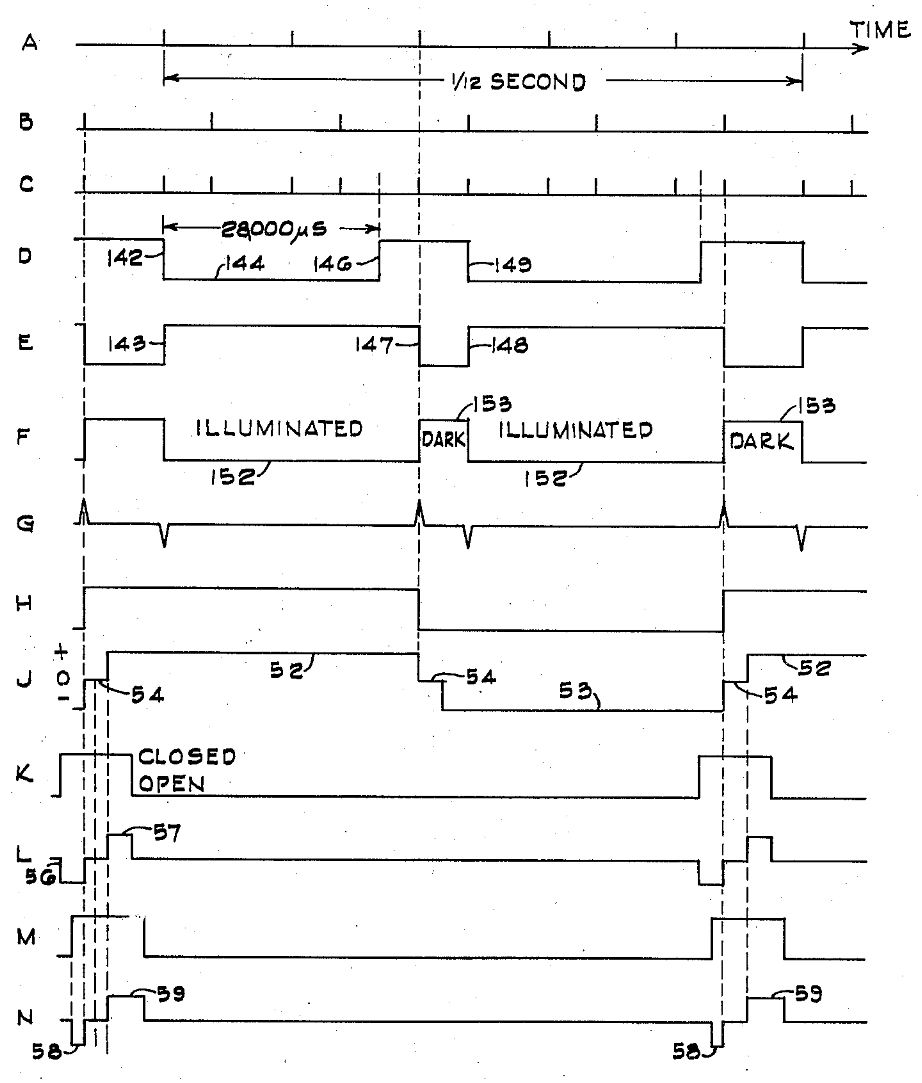
Figure 2 is a series of graphs which serve as an aid in understanding the operation of the invention.

At the same time, the shutter 46 operates to generate a twelve cycle square wave signal as indicated at H in Fig. 2 wherein the beginning of each alternation coincides with the initiation of the period when the cathode ray tube image is cut off. This twelve cycle signal thus synchronized with the periods of darkening of cathode ray tube screen is that which is applied to the coil 44 through conductor 51 and contact 32 is caused to alternate between contacts 42 and 43 in accordance therewith, remaining in contact with contact 42 for approximately $^1/_{24}$ of a second as indicated in the wave form J of Fig. 2 by the horizontal line 52 and in contact with contact 43 for approximately $^1/_{24}$ of a second as indicated at 53. The short step 54 extending between the positive and negative alternations 52 and 53 occasioned by alternate engagement of contacts 42 and 43 by the contact 32 is indicative of zero potential impressed on the contact 32 during the short interval of time while the contact 32 is in neutral position traveling from one contact position to the other.

Potential cannot, however, be applied to the motor 36 by engagement of the contact 32 with either 42 or 43 unless the switch 28 is also closed to complete the motor circuit. The switch 28 as previously indicated is closed once every revolution of the cam 23, that is, once every $\frac{1}{12}$ second and since the cam 23 is geared to the intermittent mechanism 17, the time of closing the switch 28 is in exact synchronism and phase with the pull down operation of the intermittent.

If the pull down operation is also in exact phase with the operation of the shutter 46, the darkening of the screen 13 and the generation of the 12 cycle signal applied to the coil 44, a time relationship between the closing of switch 28 and the alternations of contact 32 will be obtained as indicated at J and K of Fig. 2, wherein the contact 32 engages contacts 43 and 42 for equal lengths of time when the circuit through the motor 36 is completed by the momentary closing of the switch 28. Such a relationship is indicated at L of Fig. 2 and it will be apparent that the negative potential 56 applied to the motor 36 by simultaneous closing of the switch 28 and contacts 43 and 32 and which would tend to rotate the motor in one direction, is equally balanced by the positive potential 57 enduring for an equal interval of time occasioned by the closing of contacts 32 and 42. These equal and opposite torque impulses are applied to the motor 36 and no resultant rotation occurs.

If, however, the intermittent mechanism 17 and the shutter 46 should not be in exact phase, the relationships as indicated at M and N would obtain. That is, the switch 28 would be closed for a longer interval while the contact 32 engaged the contact 42, than while the contact 32 engaged contact 43, as indicated at 58 and 59. In such a case the positive potential being impressed on the motor for a relatively greater period of time than the negative potential would produce a resultant torque causing the motor 36 to revolve.

Such revolution of the motor results in rotation of the shaft 61 which in turn is added to or subtracted from the speed of revolution of the shaft 21 by the gear differential 22, addition or subtraction depending on the direction of the rotation of the motor 36.

Thus if the intermittent mechanism tends to lag behind the operation of the shutter 46 in blanking the screen 13 the speed of the shaft 21 is momentarily increased over the rotational speed of the motor 18 by the addition of the rotation of the motor 36, and conversely if the intermittent mechanism tends to lead the operation of the shutter 46 the speed of rotation of the shaft 21 is momentarily decreased by subtraction of the rotation of the motor 36.

The exact and specific details of the electronic shutter utilized to perform the functions described above form no part of this invention as various specific arrangements may be used to equal advantage. For example a shutter such as described in the copending application of Garman et al., Serial No. 62,872, filed December 1, 1948, may be employed and for completeness of disclosure such a shutter is briefly described herein as follows.

Figure 3:
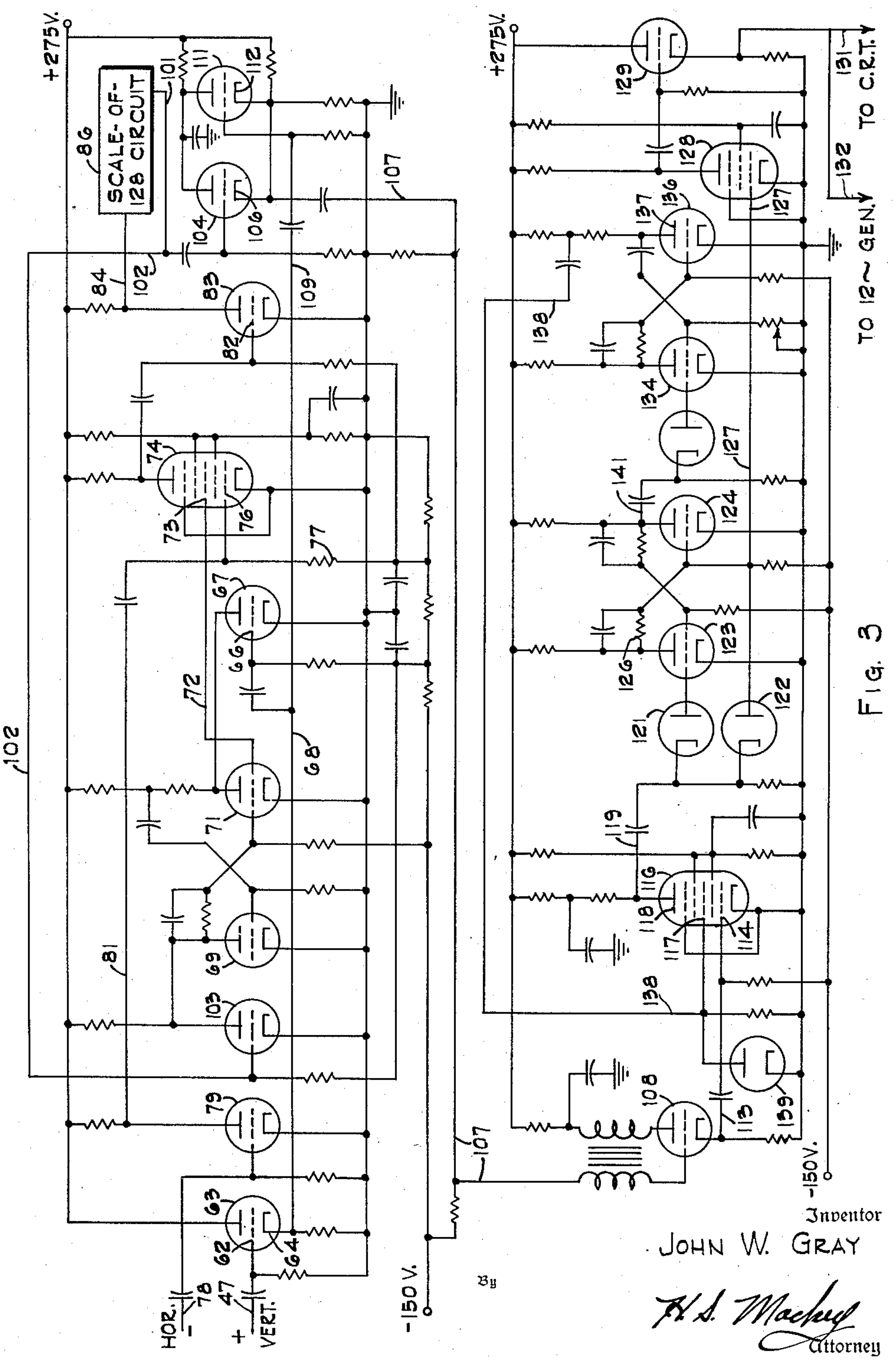
Figure 3 is a schematic illustration of an electronic shutter used in connection with the invention.

Referring to Figs. 1 and 3 a vertical synchronizing positive pulse from the television receiver is applied to the shutter circuits through a conductor 47. This pulse is impressed upon the control grid 62, Fig. 3, of a triode 63 and a positive pulse is derived from the cathode 64 and applied to the grid 66 of a trigger tube 67 by means of a conductor 68. This positive pulse actuates a long-period multivibrator comprising the tubes 69 and 71 so that the tube 69 is made non-conducting and a positive potential step is produced in the conductor 72 and on the third grid 73 of a multi-grid tube 74. The first grid 76 of this tube 74, however, is kept negative through resistor 77, thus preventing tube 74 from conducting at this time. Meanwhile, negative horizontal synchronizing pulses are continuously transmitted from the television receiver through the conductor 78, and that horizontal pulse which is received next following the above-described action is inverted and amplified in tube 79, and is applied through conductor 81 to the first grid 76 of tube 74, making it conduct and impressing a short negative pulse on the grid 82 of the tube 83, causing a short positive pulse representative of a horizontal synchronizing pulse to be applied through conductor 84 to a scale-of-128 circuit 86. Such pulses corresponding to horizontal synchronizing pulses are thereafter regularly applied until the multivibrator comprising tubes 69 and 71 is again turned off in a manner to be described later.

Figure 4:
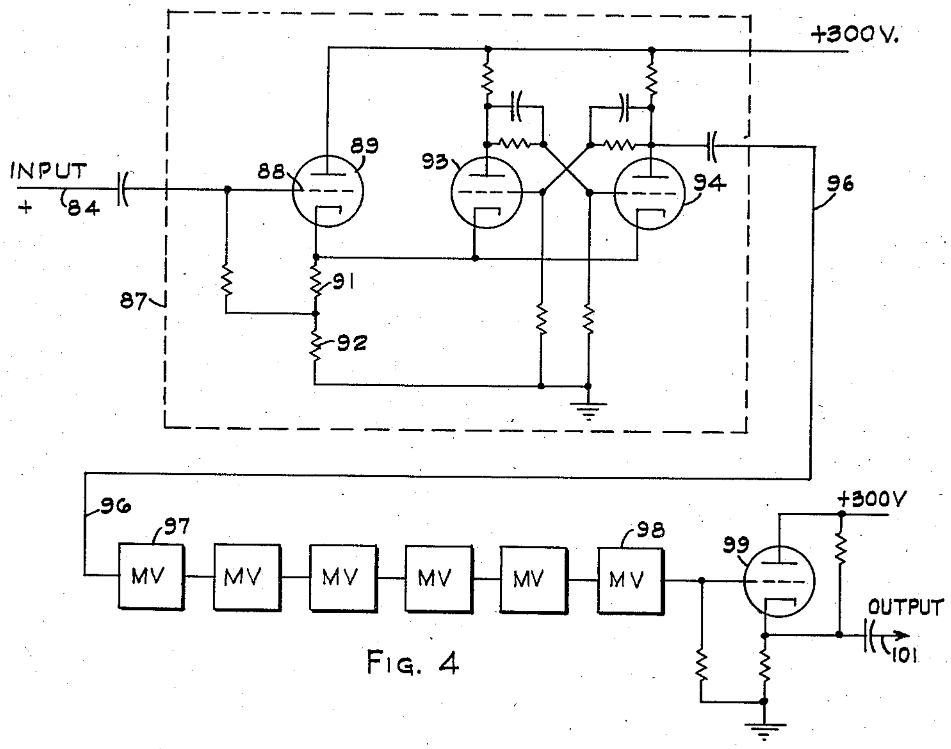
Figure 4 is a schematic illustration of a counter circuit used with the electronic shutter of Fig. 2.

The scale-of-128 circuit 86 consists of seven identical scale-of-two circuits in tandem, the first stage 87, Fig. 4, being shown in full and the other six being indicated by rectangles. Successive short positive pulses derived from horizontal synchronizing pulses as described, when applied through conductor 84 to the grid 88 of triode 89, cause pulses of current flow in the cathode circuit of the tube 89, loading its cathode resistors 91 and 92. In a multivibrator comprising tubes 93 and 94, if the tube 93 is initially conductive, the load applied by the first current pulse in the common cathode resistors 91 and 92 makes the tube 93 nonconducting and tube 94 conducting to produce a negative pulse in conductor 96. The second input pulse applied to conductor 84 produces a positive output pulse, and in general successive input pulses on conductor 84 produce alternately positive and negative output pulses. But since the circuit of these stages is not affected by negative pulses, the second stage 97 is triggered only by the positive pulses applied to it through conductor 96. Thus, the number of effective pulses emitted by the first scale-of-two stage is one-half of the number introduced, the second stage again halves the number, and so on, with the result that the output of the seventh stage 98 is one positive pulse for every 128 pulses introduced on conductor 84. This positive pulse emitted by the seventh stage 98 is transmitted through a cathode follower stage 99 to the output conductor 101, Figs. 3 and 4.

The scale-of-128 output pulses on conductor 101, Fig. 3 are transmitted through a conductor 102 and a trigger tube 103 to the multivibrator of tubes 69 and 71 to terminate its period. This terminates the positive step of potential on the third grid 73 of the gating tube 74, closing the gate and so preventing the further passage of horizontal pulses through it to the scale-of-128 circuit 86, and so terminating the operation of that circuit.

The positive pulses emitted by the scale-of-128 circuit 86 are also transmitted through a second path comprising a first mixing tube 104, from the cathode 106 of which the strengthened positive pulses are applied through conductor 107 to a blocking oscillator tube 108.

Vertical synchronizing pulses are applied from the input conductor 47 through tube 63, conductor 68 and conductor 109 to a second mixing tube 111 having its cathode 112 connected to the cathode 106 of the first mixing tube 104, so that the strengthened vertical synchronizing pulses appear in the conductor 107 along with the output of the scale-of-128 circuit, and are applied to the blocking oscillator 108.

The sequence of operations thus far described therefore results in the operation of the blocking oscillator 108 at the beginning of every vertical pulse and also at a time corresponding to 128 horizontal pulses after each vertical pulse. Since 262½ horizontal pulses occur on the average between successive vertical pulses, the successive intervals of operation of the tube 108 are alternately equal to 128 and 134½ horizontal pulse intervals. This is illustrated in Fig. 2 where A represents the times of vertical pulses spaced at $\frac{1}{60}$ second intervals, B represents pulses 128 horizontal pulse periods later, and C represents the combination of A and B. Since the outputs of the mixing tubes 104 and 111 represented by the graphs A and B are combined in the conductor 107, the graph C represents the input to the tube 108 and also the output thereof in the cathode conductor 113.

These short positive pulses in conductor 113 are impressed on the first grid 114 of a multigrid gating tube 116, and when the gate controlled by the third grid 117 of this tube is open, the short positive pulses produce corresponding negative pulses at the gating tube anode 118, which are applied through conductor 119 and trigger tubes 121 and 122 to a scale-of-two multivibrator comprising tubes 123 and 124. The output of this multivibrator consists of alternately positive and negative potential levels which are applied through resistor 126 and conductor 127 to an amplifier 128, where they are amplified and inverted and, after passing through cathode follower 129, are applied to the output conductors 131 and 132.

The multivibrator composed of tubes 123 and 124 is gated to operate at every fourth pulse applied from the blocking oscillator through control by the gating tube 116 and a single stroke 28,000 microsecond multivibrator as follows. The third grid 117 of gating tube 116 is normally positive enough to offer no barrier to conductivity of the tube. The two tubes 134 and 136 comprise a single-stroke multivibrator which, in its normal condition, conducts through tube 134. The anode 137 of tube 136 is then positive and a relatively positive step exists on the conductor 138, which however is prevented from ever rising above ground potential by the diode 139. Upon application of a blocking oscillator pulse to the grid 114, with such resulting operation of the tube 124 as to place a negative potential step on the conductor 141, the tube 136 is caused to conduct, placing a negative step on the conductor 138 of such magnitude as to make the third grid 117 of tube 116 negative, inhibiting the conduction of the gating tube 116. This potential change of the grid 117 is illustrated at 142 in the graph D, Fig. 2. The simultaneous positive change of potential of the conductor 127 is indicated by the rise 143 of the graph E, Fig. 2. Thereafter the gating tube 116 is non-conductive. Approximately 28,000 microseconds later the single-stroke multivibrator spontaneously returns to normal, terminating the gate. This period is indicated by the line 144 of graph D, Fig. 2, and is longer than any three successive pulse periods of graph C but shorter than any four of them. The termination of the gate is accordingly represented by the step 146, graph D, and as the result the next succeeding blocking oscillator pulse is not blocked by the gating tube 116; it actuates the multivibrator of tubes 123 and 124 and causes the negative step 147 in graph E, Fig. 2. The next succeeding pulse again causes a positive step 148 in graph E and a negative step 149 in graph D, and the entire operation is repeated.

The potential represented by the graph E in the conductor 127 is inverted by tube 128 so that the output potential in the conductor 131 is represented by the graph F. This potential is applied to the cathode of the cathode ray tube 12, Fig. 1, so that during the times 152, graph F, the tube screen 13 is illuminated, and during the remaining times 153 the screen is darkened. Each illuminated time is thus of exactly the duration of one television picture of two interlaced scans, and the duration of each dark time is the distance between two adjacent pulses of graph C, approximately 1/120 second, and sufficient for pulldown.

Figure 5:
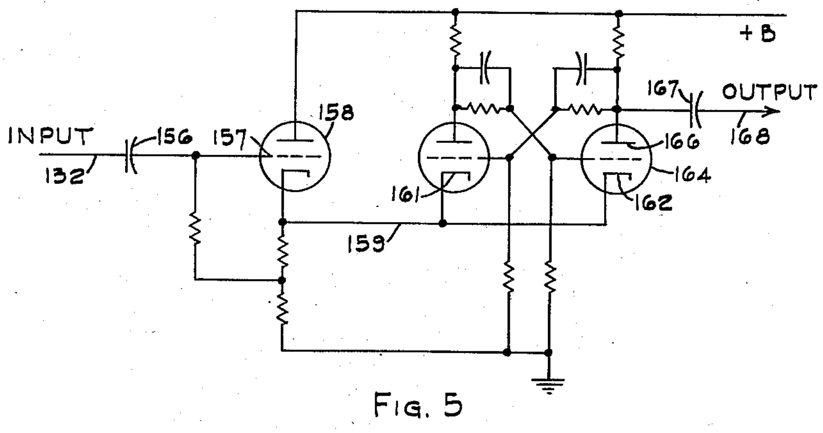
Figure 5 is a schematic illustration of the master signal generator used in the invention.

The coordination of the pulldown with the dark-time period is accomplished as follows: When a positive pulse occurs in conductor 131, Fig. 3, blanking the cathode ray tube 12, Fig. 1, as illustrated by graph F, Fig. 2, the pulse also occurs in the connected conductor 132, Fig. 3 and is applied thereby to a 12-cycle generating circuit shown schematically in Fig. 5. Such a rectangular pulse is differentiated by the condenser 156, producing sharp positive and negative pulses as shown in G, Fig. 2. These pulses are applied to the grid 157 of a trigger tube 158 Fig. 5, where the negative pulses have no effect but where each positive pulse produces a sharp increase of current, which in turn through its cathode connection 159 places a positive charge on the cathodes 161 and 162 of two scale-of-two multivibrator tubes 163 and 164, with the result that whichever tube is conducting at the time is made nonconducting while the other tube is made conducting. This produces a sudden positive or negative change in the potential of the anode 166, which is illustrated by the graph H, Fig. 2. As this graph illustrates, these successive abrupt positive and negative potential changes constitute a rectangular waveform having a nominal frequency of 12 C. P. S. when the film-advancing nominal frequency is 24 frames per second, and the positive and negative half-cycle periods of the graph H are approximately equal to each other. This 12 C. P. S. rectangular potential waveform is applied through the large condenser 167 and conductor 168 to the coil 44, Fig. 1, of the relay 33, which action through the previously-described control of the motor 36 by this relay causes correction of the speed and phase of the shaft 21 as is required for coordination of the pulldown interval of the motion picture intermittent mechanism 17 with the dark-time period of the cathode ray tube screen 13.

Figure 6:
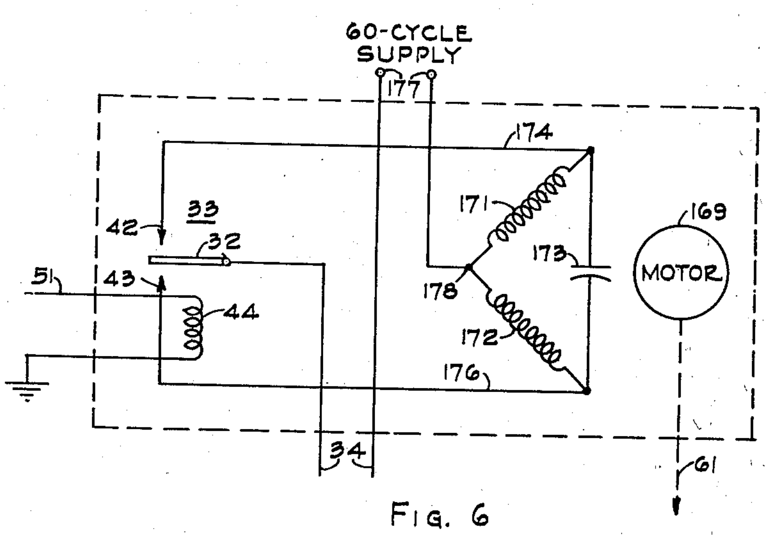
Figures 6 and 7 are schematic illustrations of modifications of a portion of the circuit of Fig. 1.

Other types of motors useful in servo applications may be employed instead of the permanent magnet motor 36. For instance a two-phase low-inertia capacitor motor may be applied to this use as illustrated in Fig. 6. Here the relay 33 is the same shown in Fig. 1 and is energized as before from the shutter through conductor 51 and its coil 44, with its arm 32 connected through conductors 34 to the cam switch contacts 28 of Fig. 1. The two-phase motor armature is represented by the circle 169 in Fig. 6, with its shaft 61 supplying a correction signal to the camera. Its two fields 171 and 172 are connected in series, with their extremities joined by a phase-advancing condenser 173. The extremities are also connected through conductors 174 and 176 to the relay contacts 42 and 43 respectively. An alternating current source 177 is connected in series between the cam switch conductors 34 and the common field terminal 178. When the relay contact 43 is closed, power is applied directly to the field 172 and power is applied to the other field 171 through the condenser 173, producing a quadrature field. The motor therefore will rotate in one direction. Upon closure of the contact 42 the field 171 receives power directly from the line and the field 172 receives power through the condenser 173, so that the rotation is in the opposite direction.

Figure 7:
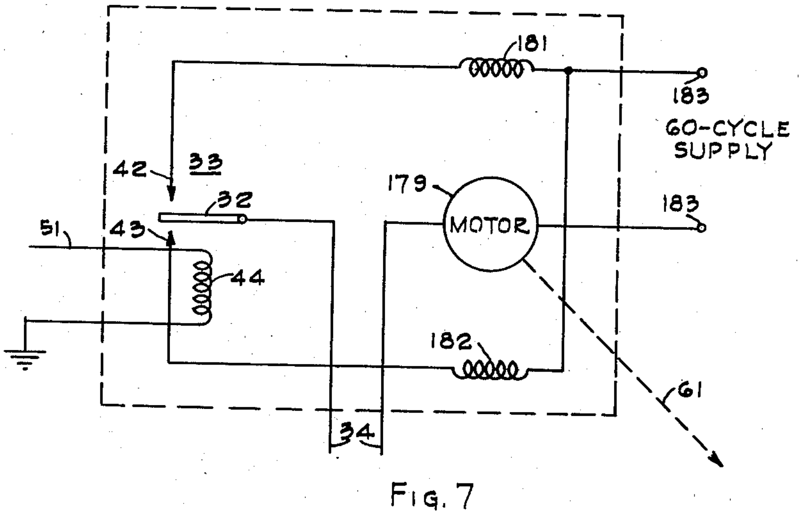

Another type of motor suitable for use is the split series field alternating current type connected as shown in Fig. 7. As before, a relay 33 similar to that shown in Fig. 1 has a coil 44 energized through conductor 51 from the shutter, with conductors 34 connecting the cam switch of Fig. 1 in series with the relay arm 32 and the motor armature 179. The motor has a field 181 for clockwise rotation and another field 182 for counterclockwise rotation. The relay contacts 42 and 43 are arranged to place either field in series with the armature across an alternating power supply 183. Rotation of the shaft 61 will obviously depend in speed and sense on the relative times of dwell of the arm 32 on the contacts 42 and 43.

Still other types such as direct current motors with double fields, three-phase motors, or in general any type that is reversible and is capable of continuous speed variation might be employed in place of the exampled types with similar results.

The relay 33, Fig. 1, may be single-pole and of the polarized type as illustrated, or it may be unpolarized and be provided with a retractile spring, in which case the coil operating potentials will ordinarily alternate between zero and a positive or negative maximum, instead of between positive and negative values as here depicted.

What is claimed is:

1. A synchronizing and phasing system for a television recorder in which television images depicted on a cathode ray tube screen are projected on a sensitized film strip comprising, an intermittent periodically advancing said film strip, electronic shutter means periodically interrupting the projection of the television images on said film strip, means for generating an alternating current signal in synchronism and in phase with the operation of said electronic shutter means, a motor, an energization circuit therefor including switching means adapted to apply equal and opposite torques to said motor in timed relation with the alternations of said alternating current signal, means in said energization circuit momentarily completing said energization circuit in timed relation to the actuation of said intermittent and means including said motor for controlling the speed of actuation of said intermittent.

2. A synchronizing and phasing system for a television recorder in which television images depicted on a cathode ray tube screen are projected on a sensitized film strip comprising, an intermittent periodically advancing said film strip, an electronic shutter operated in accordance with received television synchronizing signals to periodically blank said cathode ray tube screen, means operative in accordance with said received television synchronizing signals for generating an alternating current in synchronism and phase with the operation of said electronic shutter, a motor, an energization circuit therefor including switching means adapted to apply equal and opposite torques to said motor in timed relation with the alternations of said alternating current signal, means in said energization circuit momentarily completing said energization circuit in timed relation to the actuation of said intermittent and means including said motor for controlling the speed of actuation of said intermittent.

3. A synchronizing and phasing system for a television recorder in which television images depicted on a cathode ray tube screen are projected on a sensitized film strip comprising, an intermittent periodically advancing said film strip, electronic shutter means periodically interrupting the projection of the television images on said film strip, a reversible motor, a first energizing circuit applying energy to said motor in such a sense as to cause said motor to rotate in one direction, a second energizing circuit applying energy to said motor in such a sense as to cause said motor to rotate in the opposite direction, a first switch means selectively operable to connect one or the other of said energizing circuits to said motor, a second switch means common to said first and second circuits momentarily and intermittently completing the energizing circuit selected by said first switch means, means for operating said first switch means in synchronism with the operation of said electronic shutter means, means for operating said second switch means in synchronism with the operation of said intermittent and means including said reversible motor for controlling the speed of actuation of said intermittent.

4. A synchronizing and phasing system for a television recorder in which television images depicted on a cathode ray tube screen are projected on a sensitized film strip comprising, an intermittent periodically advancing said film strip, an electronic shutter operative in accordance with received television synchronizing signals to periodically blank said cathode ray tube screen, a reversible motor, a first energizing circuit applying energy to said motor in such a sense as to cause said motor to rotate in one direction, a second energizing circuit applying energy to said motor in such a sense as to cause said motor to rotate in the opposite direction, a first switch means selectively operable to connect one or the other of said energizing circuits to said motor, a second switch means common to said first and second circuits momentarily and intermittently completing the energizing circuit selected by said first switch means, means for operating said first switch means in synchronism with the operation of said electronic shutter, means for operating said second switch means in synchronism with the operation of said intermittent and means including said reversible motor for controlling the speed of actuation of said intermittent.

5. A synchronizing and phasing system for a television recorder in which television images depicted on a cathode ray tube screen are projected on a sensitized film strap comprising, an intermittent periodically advancing said film strip, an electronic shutter operated in accordance with received television synchronizing signals to periodically blank said cathode ray tube screen, means operative in accordance with said received television synchronizing signals for generating an alternating current in synchronism and in phase with the operation of said electronic shutter, a reversible motor, a first energizing circuit applying energy to said motor in such a sense as to cause said motor to rotate in one direction, a second energizing circuit applying energy to said motor in such a sense as to cause said motor to rotate in the opposite direction, a first switch means selectively operated in timed relation with the alternations of said alternating current to connect one or the other of said energizing circuits to said motor, a second switch means common to said first and second energizing circuits for completing the energization circuit selected by said first switch means, means for momentarily and intermittently operating said second switch means in synchronism with the operation of said intermittent and means including said reversible motor for controlling the speed of actuation of said intermittent.

6. A synchronizing and phasing system for a television recorder in which television images depicted on a cathode ray tube screen are projected on a sensitized film strip comprising, an intermittent periodically advancing said film strip, an electronic shutter operated in accordance with received television synchronizing signals generating a signal to periodically blank said cathode ray tube screen, means operated by said electronic shutter for generating an alternating current signal whose frequency is a function of the periodicity of occurrence of said blanking signal, a reversible motor, a first energizing circuit applying energy to said motor in such a sense as to cause said motor to tend to rotate in one direction, a second energizing circuit applying energy to said motor in such a sense as to tend to cause said motor to rotate in the opposite direction, a first switch means selectively operated in timed relation with the alternations of said alternating current to connect one or the other of said energizing circuits to said motor, a second switch means common to said first and second energizing circuits for completing the energization circuit selected by said first switch means, means for momentarily and intermittently operating said switch means in synchronism with the operation of said intermittent and means including said reversible motor for controlling the speed of actuation of said intermittent.

7. A synchronizing and phasing system for a television recorder in which television images depicted on a cathode ray tube screen are projected on a sensitized film strip comprising, an intermittent periodically advancing said film strip, an electronic shutter operated in accordance with received television synchronizing signals to periodically blank said cathode ray tube screen, a reversible motor, a source of energy therefor, a single-pole double-throw switch connected in circuit with said motor and said source of energy operative in one position of contact to so energize said motor by said source as to tend to cause said motor to rotate in one direction and in the other position of contact to so energize said motor by said source as to tend to cause it to rotate in the opposite direction, a second switch connected in circuit with said motor and said source for completing a circuit through said motor and a selected contact of said single-pole double-throw switch, means for operating said single-pole double-throw switch to its alternate positions of contact in synchronism with the operation of said electronic shutter, means for momentarily and intermittently operating said second switch in synchronism with the operation of said intermittent and means including said reversible motor for controlling the speed of actuation of said intermittent.

8. A synchronizing and phasing system for a television recorder in which television images depicted on a cathode ray tube screen are projected on a sensitized film strip comprising, an intermittent periodically advancing said film strip, an electronic shutter operated in accordance with received television synchronizing signals to periodically blank said cathode ray tube screen, means operative in accordance with said received television synchronizing signals for generating an alternating current signal in synchronism and in phase with the operation of said electronic shutter, a reversible motor, a source of energy therefor, a single-pole double-throw switch connected in circuit with said motor and said source of energy operative in one position of contact to so energize said motor by said surce as to tend to cause said motor to rotate in one direction and in the other position of contact to so energize said motor by said source as to tend to cause it to rotate in the opposite direction, means operative by said alternating current signal to cause said single-pole double-throw switch to selectively engage its alternate positions of contact in timed relation to the alternations of said alternating current signal, a second switch connected in circuit with said motor and said source for completing a circuit through said motor and a selected contact of said single-pole double-throw switch, means for momentarily and intermittently operating said second switch in synchronism with the operation of said intermittent and means including said reversible motor for controlling the speed of actuation of said intermittent.

9. A synchronizing and phasing system for a television recorder in which television images depicted on a cathode ray tube screen are projected on a sensitized film strip comprising, an intermittent periodically advancing said film strip, an electronic shutter operated in accordance with received television synchronizing signals generating a signal to periodically blank said cathode ray tube screen, means operated by said electronic shutter for generating an alternating current signal whose frequency is a function of the periodicity of occurrence of said blanking signal, a reversible motor, a source of energy therefor, a single-pole double-throw switch connected in circuit with said motor and said source of energy operative in one position of contact to so energize said motor as to tend to cause said motor to rotate in one direction and in the other position of contact to so energize said motor as to tend to cause it to rotate in the opposite direction, means operative by said alternating current signal to cause said single-pole double-throw switch to selectively engage its alternate positions of contact in timed relation to the alternations of said alternating current signal, a second switch connected in circuit with said motor and said source for completing a circuit through said motor and a selected contact of said single-pole double-throw switch, means for momentarily and intermittently operating said second switch in synchronism with the operation of said intermittent and means including said reversible motor for controlling the speed of actuation of said intermittent.

10. A synchronizing and phasing system comprising, first and second cyclic means, a reversible motor, a first energizing circuit applying energy to said motor in such a sense as to cause said motor to rotate in one direction, a second energizing circuit applying energy to said motor in such a sense as to cause said motor to rotate in the opposite direction, a first switch means selectively operable to connect one or the other of said energizing circuits to said motor, a second switch means common to said first and second energizing circuits momentarily and intermittently completing the energizing circuit selected by said first switch means, means for operating said first switch means in synchronism with said first cyclic means and means for operating said second switch means in synchronism with said second cyclic means.

JOHN W. GRAY.

REFERENCES CITED

The following references are of record in the file of this patent:

UNITED STATES PATENTS

| Number | Name | Date |
|---|---|---|
| 2,212,447 | Mathes | Aug. 20, 1940 |
| 2,404,839 | Hammond | July 30, 1946 |